United States Patent [19]

Ishida

[11] Patent Number: 4,733,642
[45] Date of Patent: Mar. 29, 1988

[54] COMBUSTION CHAMBER FOR INTERNAL COMBUSTION ENGINE

[75] Inventor: Shiro Ishida, Fujisawa, Japan

[73] Assignee: Isuzu Motors Limited, Tokyo, Japan

[21] Appl. No.: 939,989

[22] Filed: Dec. 10, 1986

[30] Foreign Application Priority Data

Dec. 10, 1985 [JP] Japan .................. 60-276024

[51] Int. Cl.$^4$ .............................................. F02B 19/08
[52] U.S. Cl. .................................. 123/276; 123/263; 123/301
[58] Field of Search ............... 123/262, 263, 276, 279, 123/301, 305, 260

[56] References Cited

U.S. PATENT DOCUMENTS

| | | | |
|---|---|---|---|
| 2,046,263 | 6/1936 | Hesselman | 123/276 |
| 2,457,652 | 12/1948 | Fisher | 123/276 |
| 3,534,714 | 10/1970 | Urlab | 123/276 |
| 3,550,566 | 12/1970 | Hoffmann | 123/301 |
| 3,892,221 | 7/1975 | Kimbara et al. | 123/276 X |
| 4,641,617 | 2/1987 | Aoyama et al. | 123/301 X |

FOREIGN PATENT DOCUMENTS 226226 12/1984 Japan .................... 123/263

Primary Examiner—Tony M. Argenbright
Attorney, Agent, or Firm—Cullen, Sloman, Cantor, Grauer, Scott & Rutherford

[57] ABSTRACT

Described herein is a combustion chamber for internal combustion engine, including a protuberance extending radially inward from a peripheral wall surface of a combustion chamber which is formed by hollowing the top of a piston in the axial direction thereof. The protuberance induces rolling streams turning in the same direction as the fuel swirl thereby collecting air and atomized fuel in a region on the upstream side of the protuberance. The rolling stream serves to improve the ignition quality by enriching the concentration of fuel vapors in that locality. The flames generated in the vicinity of the protuberance are propagated to the atomized fuel which is supplied to other regions of the combustion chamber, thereby providing an internal combustion engine with improved ignition and combustion qualities.

18 Claims, 6 Drawing Figures

COMBUSTION CHAMBER FOR INTERNAL COMBUSTION ENGINE

BACKGROUND OF THE INVENTION

1. Field of the Invention

This invention relates to a combustion chamber for internal combustion engines, and more particularly to a combustion chamber for an internal combustion engine employing a spark plug for igniting a volatile fuel of low cetane number such as alcohol, gasoline or the like.

2. Description of the Prior Art

Generally, a Diesel engine spark assisting device as shown in FIG. 6 of the accompanying drawings (disclosed in Japanese Laid-Open Utility Model Application No. 58-178419) is known as a spark plug ignition means ensuring high thermal efficiency and good mileage.

According to this prior disclosure, in a combustion chamber b which is hollowed out of a piston top a, a spark plug f is located so as to have a spark position upstream of a sprayed zone d of a fuel injected toward the inner wall c of the combustion chamber b when viewed in the direction of a swirl S, and in the vicinity of the inner wall c.

With this arrangement, the time required to reach a spark position from an injection point by the sprayed fuel zone d which is carried away from the upstream side to the downstream side by the swirl S is utilized as a volatilization period for evaporating the fuel by contact with compressed air, thereby improving the degree of air-fuel mixing for attaining higher ignition and starting qualities.

However, the arrangement in this prior disclosure is not capable of igniting and burning a volatile fuel of low cetane number such as alcohol, gasoline or the like. A volatile fuel is instantly volatilized and dispersed upon being injected into the combustion chamber due to its high volatility, so that it is necessary to increase the amount of fuel injection or to adjust the air-fuel ratio by throttling intake air to enrich the air-fuel mixture into a concentration suitable for sparking ignition and flame propagation.

The throttling of intake air, however, increases the pumping job of the internal combustion engine, and is therefore undesirable from the standpoint of mileage and output qualities. Because of these disadvantages, there has been a demand for new techniques which can distribute an air-fuel mixture of a suitable concentration in terms of ignition and combustion qualities to the neighborhood of the sparking terminal of a spark plug.

SUMMARY OF THE INVENTION

The present invention eliminates the above-mentioned problems and drawbacks. Specifically, it is an object of the present invention to provide a combustion chamber for an internal combustion engine, which can produce an air-fuel mixture of suitable richness in the vicinity of a spark plug, which is located in the combustion chamber for burning a volatile fuel of low cetane number such as light oil, alcohol, gasoline or the like, thereby ensuring satisfactory starting characteristics as well as stable combustion quality in all load ranges of engine operation.

In accordance with the present invention, the above-mentioned object is achieved by providing a combustion chamber of the following construction, including:

A combustion chamber formed by hollowing the top of a piston in the axial direction thereof, and formed with a protuberance extending radially inward a suitable degree from an inner peripheral wall surface thereof; a fuel injection nozzle means which is positioned to supply atomized fuel to an inner wall portion on the upstream side, in the direction of a fuel swirl, and in the vicinity of the radial protuberance and also toward other wall portions on the inner periphery of the combustion chamber; a spark plug means which is located in the combustion chamber on the upstream side of and in the vicinity of the radial protuberance, in the direction of the swirl, the sparking terminal of the plug being received in the combustion chamber when the piston is moved to a point in the vicinity of its top dead center, to accelerate ignition of the atomized fuel.

In operation, a vortical flow of air which is supplied to the combustion chamber in the piston top forms a swirl turning about the center axis of the combustion chamber. The velocity of this swirl is increased by the radial protuberance, which induces rolling streams turning in the same direction as the swirl on the upstream side thereof, entraining and stirring the atomized fuel which is supplied through the fuel injection means, as well as air in the center portion of the combustion chamber and air in the neighborhood of the radial projection. These rolling streams stir the trapped fuel and volatilize same by hot compressed air in the streams, mixing the volatilized fuel with air to produce an air-fuel mixture having good ignition and combustion qualities. Thus, an enriched air-fuel mixture is locally produced.

On the other hand, the atomized fuel which is supplied toward other peripheral wall portions of the combustion chamber is stirred by the swirl and volatilized by the heat of the compressed air, so that an air-fuel mixture of suitable concentration is evenly dispersed and distributed in the combustion chamber. Consequently, as soon as the air-fuel mixture which is formed by the rolling streams is ignited by a spark from the spark plug means, flame propagation takes place promptly in the combustion chamber. Therefore, the combustion is effected stably under any load condition, supressing HC, $NO_x$ and smoke.

The above and other objects, features and advantages of the invention will become more apparent from the following description and the appended claims, taken in conjunction with the accompanying drawings which show by way of example preferred embodiments of the invention.

DESCRIPTION OF PREFERRED EMBODIMENTS

Figure 1:
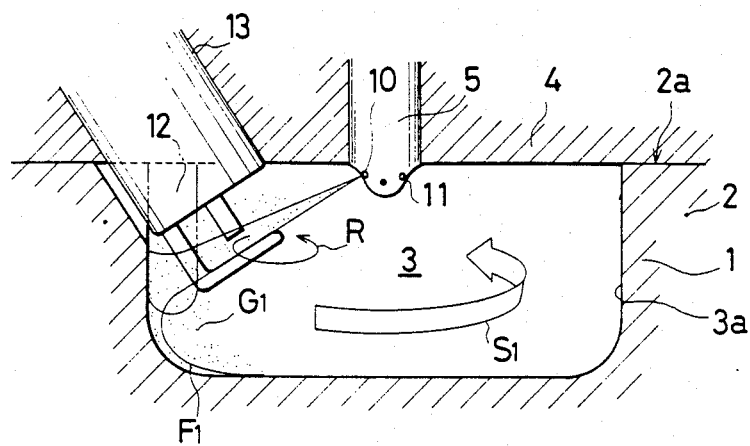
FIG. 1 is a schematic sectional view of a combustion chamber for an internal combustion engine embodying the present invention.
Figure 2:
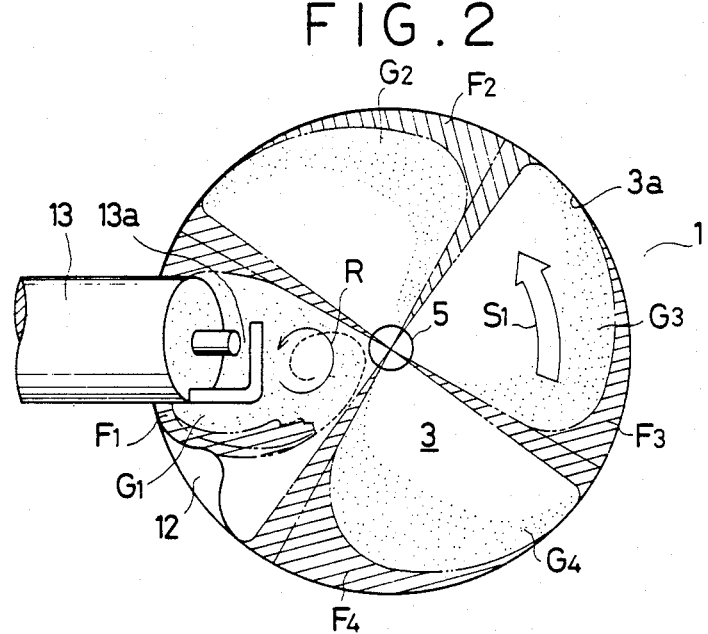
FIG. 2 is a plan view of the combustion chamber of FIG. 1.

Referring to FIGS. 1 and 2, there is shown a combustion chamber for internal combustion engine, embodying the present invention, in which indicated at 1 is a piston, at 2 a piston top, at 3 a combustion chamber, and at 4 a cylinder head.

As shown in FIG. 1, the combustion chamber 3 is formed in the piston 1 by hollowing an open cavity deeply in the axial direction from a piston top 2a. In this particular embodiment, the combustion chamber 3 has a circular shape in cross section taken perpendicularly across the axis of the piston 1.

The combustion chamber is supplied with intake air through a swirl port, not shown, forming a swirl S1 turning along the peripheral wall 3a, of the combustion chamber 3.

A feature of the internal combustion engine according to the invention resides in that volatile fuel of low cetane number can be burned without ignition failures in engine operations under any load range including the engine-starting stage.

The shape of the combustion chamber will now be explained in relation to the fuel injection nozzle means and the spark plug means which are provided therein.

Figure 4:
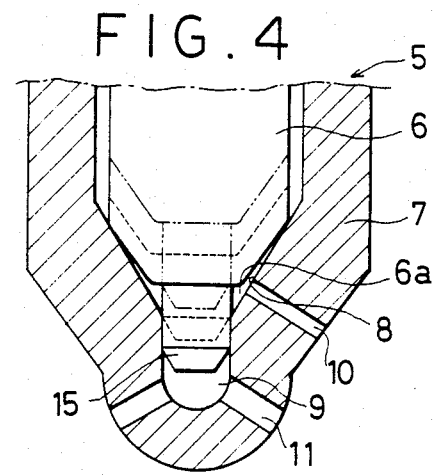
FIG. 4 is a fragmentary sectional view of an injection nozzle.

The fuel injection nozzle means 5 is arranged as shown particularly in FIG. 4. A nozzle casing 7 which movably receives therein a needle valve 6 is formed with a valve seat 8 at its front end for engagement with a throttle portion 6a of the needle valve 6. Formed in the front end portion of the nozzle casing 7 is a fuel injection chamber 9 which extends axially from the valve seat 8 and is opened and closed by the throttle portion 6a which forms the front end portion of the needle valve 6. The valve seat 8 contains one auxiliary nozzle hole 10, while the fuel injection chamber 9 has a plurality of main nozzle holes 11 in its peripheral wall at predetermined intervals.

The auxiliary nozzle hole 10 of the fuel injection nozzle means 5 has a smaller diameter than the main nozzle holes 11. The auxiliary nozzle hole 10 is opened when the lift of the needle valve 6 is in a certain range below a predetermined value, and the main nozzle holes 11 are also opened when the lift exceeds the predetermined value. Thus, the fuel injection nozzle means 5 which is employed in this embodiment constitutes the so-called pintaux type.

Figure 3:
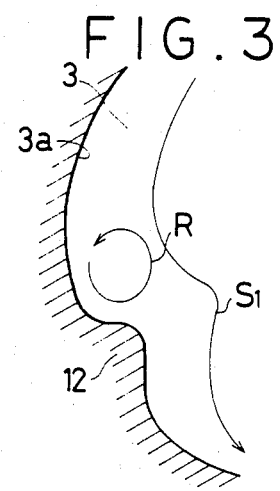
FIG. 3 is a schematic illustration of rolling streams induced by a protuberance.

As shown particularly in FIGS. 1 to 3, the combustion chamber 3 is formed with a protuberance 12 which is raised and extends radially inward from the surface of a peripheral wall 3a of the combustion chamber 3.

As shown in FIG. 3, this protuberance 12 functions to increase the velocity of the swirl S1 in the neighboring regions, and locally generate rolling streams turning in the same direction as the swirl S1 on the upstream side of the protuberance 12 in the flow direction of the swirl S1, rolling thereinto compressed air which is distributed to the center portions of the combustion chamber 3 as well as compressed air which is distributed to the vicinity of the protuberance 12.

Accordingly, an enriched air-fuel mixture can be distributed locally in the combustion chamber 3 by entraining a suitable amount of injected fuel into the rolling streams R and volatilizing same in an accelerated manner.

For this purpose, as shown in FIGS. 1 and 2, the fuel injection nozzle means 5 is located substantially in a center position of the combustion chamber 3. The auxiliary nozzle hole 10 of the fuel injection means 5 is opened toward a peripheral wall 3a in the vicinity of the upstream side of the protuberance 12 in the flow direction of the swirl S1. The spark plug means 13 is fixedly fitted in the cylinder head and a notched groove in an upper marginal edge portion of the combustion chamber 3, and its sparking end 13a is disposed in the vicinity of the protuberance of the combustion chamber 3 when the piston is moved to a position in the vicinity of its upper top dead center.

On the other hand, the main nozzle holes 11 of the fuel injection nozzle means 5 (the four main nozzle holes 11 in this particular embodiment) are directed toward equidistant segmental areas on the peripheral wall of the combustion chamber 3.

In the present embodiment, the fuel injection nozzle means 5 is provided with only one auxiliary nozzle hole for ensuring satisfactory ignitability and combustibility, imparting a predetermined penetrating force to the atomized fuel from the auxiliary nozzle hole relative to the intensity of the rolling streams R.

In the case where only one auxiliary nozzle hole is provided, it is possible to entrap part of the injected fuel in the rolling streams R to enrich the air-fuel mixture in the rolling streams R to a suitable concentration, while letting the remainder of the injected fuel penetrate the rolling streams R and deposit in the form of a uniform thin film F1 (a liquid film) on a peripheral wall portion 3a on the upstream side of the protuberance 12 in the flow direction of the swirl S1. Thus, the rolling streams R function to generate a fuel vapor layer G1 of a concentration suitable for ignition and simultaneously accelerate volatilization of the fuel film F1 on the wall surface, while also rolling in and collecting the volatilized part of the fuel.

In order to disperse the injected fuel uniformly in the combustion chamber for flame propagation, the fuel injection nozzle means is provided with four main nozzle holes 11. The diameter and directions of these main nozzle holes 11 are determined such that part of the atomized fuel which is supplied to the combustion chamber is entrained on the swirl S1 and instantly volatilized by the heat of compressed air to generate fuel vapor layers G2 to G4, while the remainder of the atomized fuel deposits on the opposing peripheral wall portions 3a to form fuel films F2 to F4 thereon.

The above-described combustion chamber for an internal combustion engine according to the invention operates in the following manner. As illustrated in FIG. 3, under light load conditions including the engine-starting stage, the needle valve 6 of the fuel injection nozzle means 5 is lifted to a certain extent, disengaging the throttle portion 6a of the valve 6 from the valve seat 8. Since the stem portion 15 which is formed coaxially at the front end of the throttle portion 6a holds the fuel injection chamber 9 in a closed state until the valve lift reaches a predetermined value, only the auxiliary nozzle hole 10 is opened as shown in FIGS. 1 and 2 to supply atomized fuel to the upstream side of the protuberance 12.

Part of the atomized fuel which is supplied from the auxiliary nozzle hole 10 is engulfed by the rolling streams R and volatilized in an accelerated manner therein. Accordingly, a volatilized fuel layer G1 with good ignitability is distributed to the neighborhood of the sparking end 13a of the spark plug means 13, and, if a spark is produced at this point in time, the volatilized fuel layer G1 undergoes rapid combustion, suppressing generation of hydrocarbons. On the other hand, volatilization of the fuel film F1 is accelerated by the resulting flame energy. As a result, the volatilized part of the fuel film is entrained and confined in the rolling streams R, so that flame propagation takes place adequately on the upstream side of the protuberance 12 in the flow direction of the swirl S1, thereby effecting combustion of good quality.

Under medium and high load operation, the needle valve 6 is lifted in excess of the predetermined lift value to open the main nozzle holes 11. The fuel which is supplied in atomized state from a plural number of main nozzle holes 11 is partly volatilized upon contact with hot air, and carried away toward the downstream side with the swirl S1 turning in the combustion chamber 3. The remainder of the atomized fuel is deposited on the peripheral wall 3a in the form of fuel films F2 to F4, and volatilized by the heat of compressed air and the wall heat.

The amount of fuel injection through the respective main nozzle holes 11 is greater than that of the auxiliary nozzle hole 10, and is increased according to the load condition, supplying to the combustion an air-fuel mixture of uniform and desired concentration. At this time, the atomized fuel supplied from the auxiliary nozzle hole 10 has already been ignited and burned, so that the air-fuel mixture undergoes rapid combustion of flame propagation. As mentioned hereinbefore, the rapid combustion suppresses production of hydrocarbons.

In this manner, a volatile fuel of low cetane number can be burned without misfiring under a light load operating range, while achieving combustion which is satisfactory in mileage and output under medium and high load operating ranges.

Figure 5:
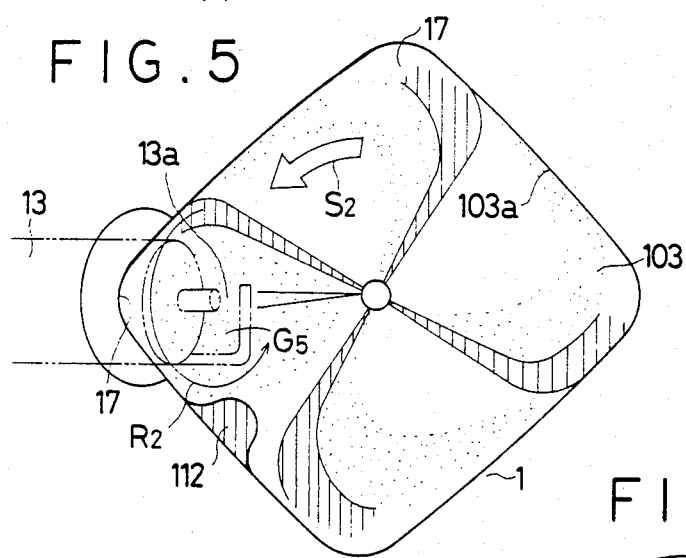
FIG. 5 is a schematic plan view of another embodiment of the invention.
Figure 6:
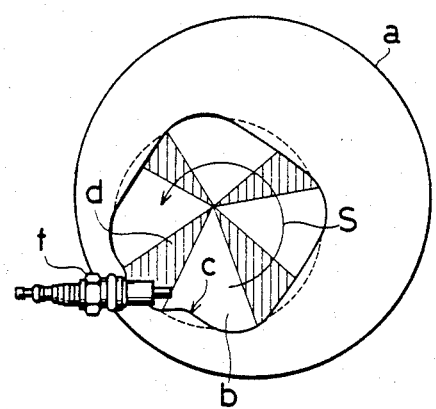
FIG. 6 is a schematic plan view of a conventional spark assisting device for a Diesel engine.

Referring now to FIG. 5, there is shown a second embodiment of the invention. In this embodiment, a combustion chamber 103 is formed into the piston top, the combustion chamber 103 having substantially a rectangular shape in section perpendicularly across the axis of the piston. In this case, a protuberance 112 corresponding to the protuberance 12 of the first embodiment is provided, when viewed in the flow direction of a swirl S2, on the downstream side of a corner portion 17 which connects adjacent peripheral walls 103a to each other. The fuel injection nozzle means and spark plug means employed in this embodiment are of the same construction as in the foregoing embodiment.

The auxiliary nozzle hole 10 of the fuel injection nozzle means 5 is directed toward the corner portion 17, while the main nozzle holes 11 are directed toward the peripheral walls 103a of the combustion chamber 103 in the same manner as in the first embodiment. The spark plug means 13 is located in the neighborhood of the corner portion on the upstream side of the protuberance 112 in the flow direction of the swirl S2.

Thus, in this embodiment, the compressed air which is distributed to the corner portion 17 by fluid inertia of the swirl S2 is hardly stirred, and therefore forms rolling streams R2 which turn in the same direction as the swirl S2. Due to the existence of the rolling stream R2, the atomized fuel supplied from the auxiliary nozzle hole 10 is distributed to the corner portion 17 on the upstream side of the protuberance 112 in the direction of the swirl S. Consequently, a volatilized fuel layer G5 is distributed to the neighborhood of the sparking end 13a by the rolling stream R1. This improves the degree of stability in ignition and combustion characteristics.

What is claimed is:

1. A combustion chamber arrangement for an internal combustion engine, comprising:
   a combustion chamber defined in the top of a piston in the axial direction of said piston and within which fuel may swirl;
   a protuberance extending radially inward from a peripheral wall surface of said combustion chamber, said protuberance including a surface area configured to reverse the flow of a portion of the fuel swirl along said peripheral wall surface;
   fuel injection nozzle means for supplying atomized fuel toward a peripheral wall of the combustion chamber in the general area of and on the upstream side of said protuberance in the direction of fuel swirl in said combustion chamber and also toward the other peripheral walls of said combustion chamber; and
   spark plug means located in said general area and on the upstream side of said protuberance in the direction of said swirl to accelerate ignition of atomized fuel supplied thereto.

2. The combustion chamber arrangement of claim 1, wherein said fuel injection nozzle means is provided with an auxiliary nozzle hole for supplying atomized fuel toward said peripheral wall surface on the upstream side of said protuberance in the direction of said swirl and main nozzle holes for supplying atomized fuel toward a number of equidistantly spaced segmental areas on the peripheral walls of said combustion chamber.

3. The combustion chamber arrangement of claim 2, wherein said fuel injection means is adapted to open said auxiliary nozzle hole before said main nozzle holes are opened.

4. The combustion chamber arrangement of claim 2, wherein said auxiliary nozzle hole of said fuel injection means has an open area smaller than the open area of said main nozzle holes.

5. The combustion chamber arrangement of claim 3, wherein said auxiliary nozzle hole of said fuel injection means has an open area smaller than the open area of said main nozzle holes.

6. The combustion chamber arrangement of claim 1, wherein said fuel injection nozzle means is fixedly fitted in a cylinder head and is located substantially in the center of said combustion chamber.

7. The combustion chamber arrangement of claim 2, wherein said fuel injection nozzle means is fixedly fitted in a cylinder head and is located substantially in the center of said combustion chamber.

8. The combustion chamber arrangement of claim 3, wherein said fuel injection nozzle means is fixedly fitted in a cylinder head and is located substantially in the center of said combustion chamber.

9. The combustion chamber arrangement of claim 4, wherein said fuel injection nozzle means is fixedly fitted in a cylinder head and is located substantially in the center position of said combustion chamber.

10. The combustion chamber arrangement of claim 1, wherein said spark plug means is fixedly fitted in a cylinder head.

11. The combustion chamber arrangement of claim 1, wherein said protuberance extends downwardly toward the bottom of said combustion chamber.

12. The combustion chamber arrangement of claim 1, wherein the projection of said protuberance gradually increases in the circumferential direction of said combustion chamber and then gradually decreases after reaching a maximum point of radial extension.

13. The combustion chamber arrangement of claim 11, wherein the projection of said protuberance gradually increases in the circumferential direction of said combustion chamber and then gradually decreases after reaching a maximum point of radial extension.

14. The combustion chamber arrangement of claim 1, wherein said protuberance has a bell-like shape in section taken perpendicularly across the axis of said piston.

15. The combustion chamber arrangement of claim 11, wherein said protuberance has a bell-like shape in section taken perpendicularly across the axis of said piston.

16. The combustion chamber arrangement of claim 1, wherein said combustion chamber has a circular shape in section taken perpendicularly across the axis of said piston.

17. The combustion chamber arrangement of claim 1, wherein said combustion chamber has a polygonal shape in section taken perpendicularly across the axis of said piston, said spark plug means is located in a corner portion of said polygonal shape, said protuberance is formed on the downstream side of said corner portion in the direction of said swirl, and said fuel injection nozzle means is adapted to supply atomized fuel toward said corner portion and toward peripheral wall portions of said combustion chamber.

18. The combustion chamber arrangement of claim 17, wherein said polygonal combustion chamber has a square shape in section.

* * * * *